E. L. FOLSE & S. E. ROBICHAUX.
MOTOR VEHICLE.
APPLICATION FILED JUNE 7, 1912.

1,170,887.

Patented Feb. 8, 1916.
2 SHEETS—SHEET 1.

WITNESSES

INVENTORS
STANILAUS E. ROBICHAUX
EDDIE L. FOLSE
BY
ATTORNEYS

E. L. FOLSE & S. E. ROBICHAUX.
MOTOR VEHICLE.
APPLICATION FILED JUNE 7, 1912.
1,170,887.
Patented Feb. 8, 1916.
2 SHEETS—SHEET 2.
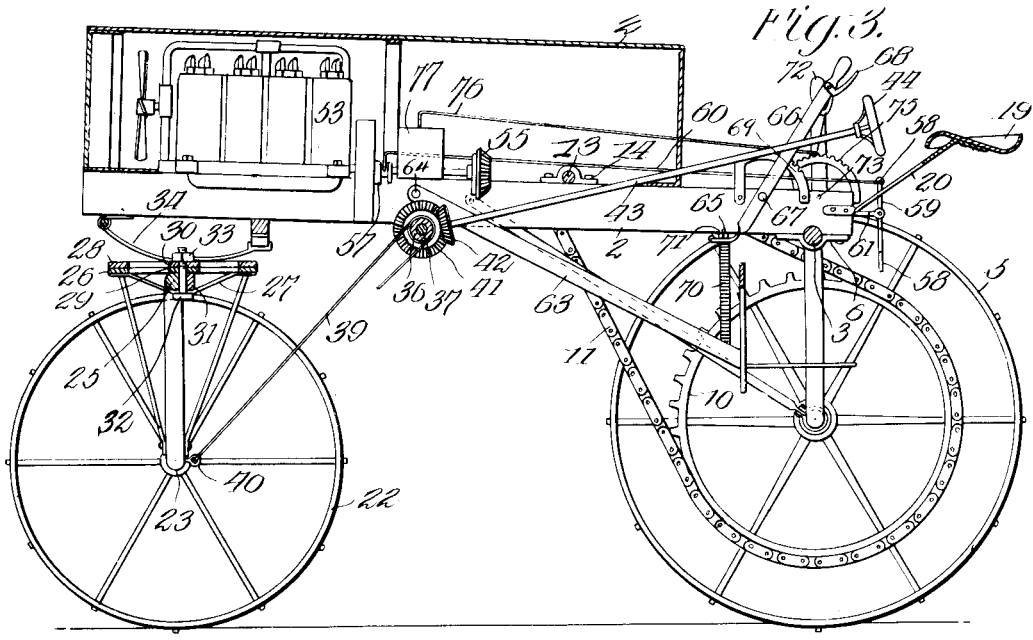
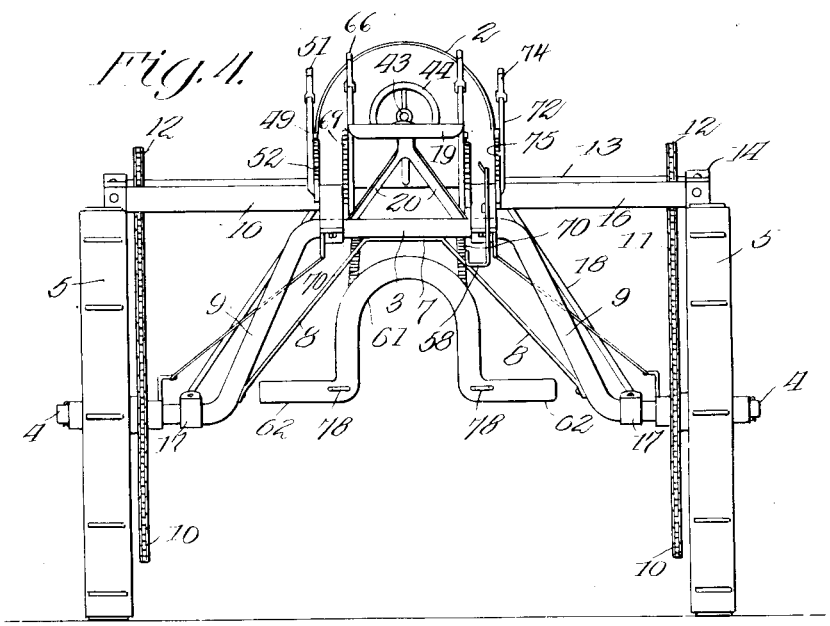
WITNESSES
INVENTORS
STANILAUS F. ROBICHAUX
EDDIE L. FOLSE
BY
ATTORNEYS

UNITED STATES PATENT OFFICE.

EDDIE L. FOLSE AND STANISLAUS E. ROBICHAUX, OF RACELAND, LOUISIANA.

MOTOR-VEHICLE.

1,170,887.    Specification of Letters Patent.    Patented Feb. 8, 1916.

Application filed June 7, 1912. Serial No. 702,260.

*To all whom it may concern:*

Be it known that we, EDDIE L. FOLSE and STANISLAUS E. ROBICHAUX, citizens of the United States, and residents of Raceland, in the parish of Lafourche and State of Louisiana, have invented a new and useful Improvement in Motor-Vehicles, of which the following is a specification.

Our invention is an improvement in motor vehicles and has for its object the provision of a simple inexpensive vehicle of the character specified, having means adapted to support cultivating mechanism, and adapted to be driven by the same motor that drives the vehicle.

Figure 1:
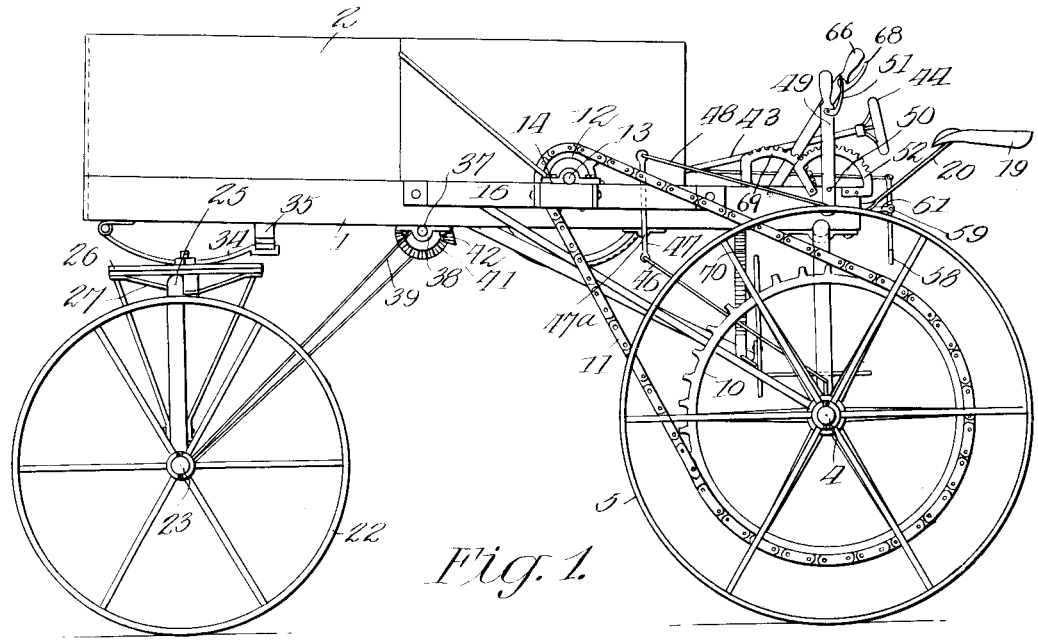
Figure 2:
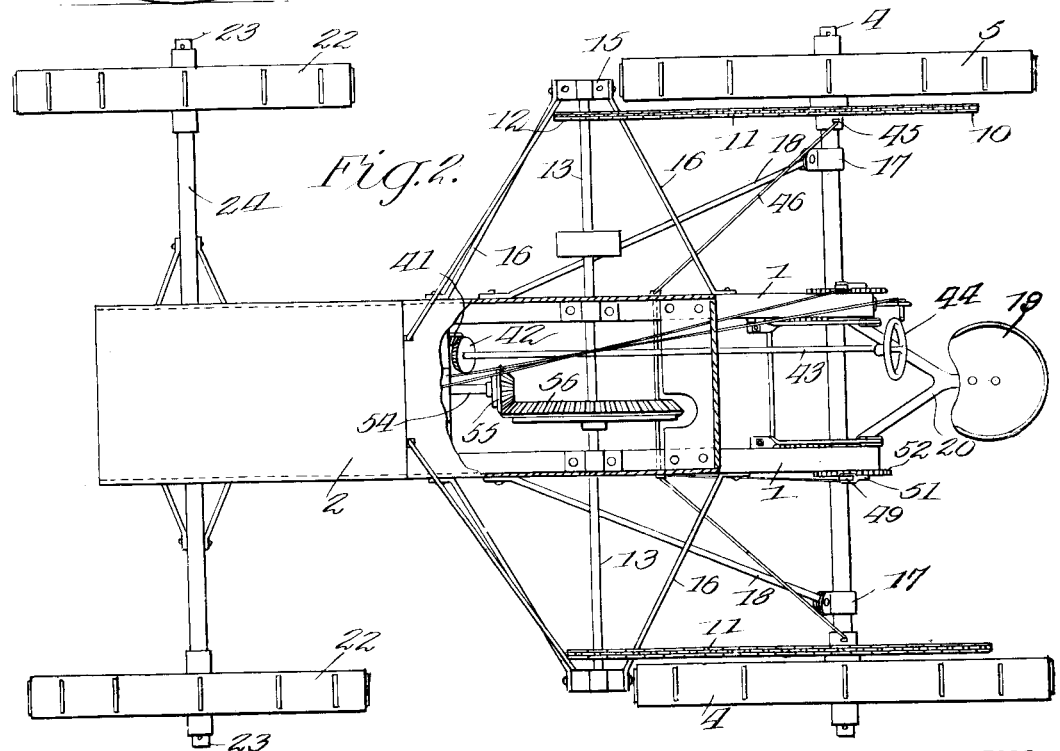

In the drawings:—Figure 1 is a side view of the improvement; Fig. 2 is a plan view, partly in section; Fig. 3 is a longitudinal vertical section; and Fig. 4 is a rear view.

In the present embodiment of the invention a frame is provided, consisting of parallel laterally spaced longitudinal bars 1, the said bars being connected by an inclosing casing or hood 2, at their front ends, the hood being arc shaped in cross section. An axle is arranged transversely of the rear of the frame, the said axle comprising an arch or body 3, and laterally offset alined spindles 4. A wheel 5 is journaled on each of the spindles, and the body 3 is journaled in bearings 6 at the rear ends of the bars 1. A substantially U-shaped brace comprising a body 7 and arms 8 is arranged between the body and the spindles of the axle, the body 7 of the brace being secured to the body 3 of the axle, while the arms 8 of the brace are secured to the connecting portion 9 of the axle between the spindles and the body. A sprocket ring or wheel 10 is secured coaxially to each wheel, and a chain 11 connects each ring or wheel to a sprocket wheel 12 on the adjacent end of a shaft 13, journaled in bearings 14, on the upper faces of bars 1, at approximately their center. The ends of the shaft 13 which are extended beyond the frame are supported by bearing blocks 15, each of which is connected to the adjacent bar 1 by inclined brace arms 16.

A split sleeve or collar 17 encircles each end of the axle, near the wheel, and each sleeve is connected to the adjacent side of the frame by an inclined brace 18. A seat 19 is supported in rear of the frame, by a substantially V-shaped bracket 20, the seat being secured to the body of the bracket, while the arms are secured to the inner faces of the bars 1.

The front end of the frame is supported by wheels 22, each of which is journaled on a spindle 23 at the end of a front axle 24. The axle has an arch at its center, and the body 25 of the arch is held between the lower member 26 of a fifth wheel and a hanger 27. The upper member 28 of the fifth wheel is superposed on the lower member and a bolt 32 connects the centers of the members of the fifth wheel to the axle. The bolt 32 is passed through the center of the hanger, between the body of the arch and a bar or block 31 arranged behind the axle, through the centers or hubs 29 and 30 of the fifth wheel members, and is then engaged by a nut 33.

A pair of laterally spaced semi-elliptical springs 34 are arranged longitudinally of the body, and the said springs are connected at their front ends to the frame. A semi-elliptical leaf spring 35 is arranged transversely of the frame, at the rear ends of springs 34, and the said rear ends are connected to the ends of spring 35.

The axle 24 may swing with respect to the frame, on the bolt 32, and means is provided for swinging the axle to steer the machine. The said means comprises a drum 36, secured to a shaft 37, journaled in bearings 38 on the frame, and a cord 39 or like flexible member winds intermediate its ends on the drum. The ends of the cord are connected to eyes 40 at the opposite ends of the axle.

A bevel gear wheel 41 is secured to the shaft 37, and meshes with a bevel gear 42 on one end of a steering shaft 43. A hand-wheel 44 is secured to the other end of the steering shaft, and the said shaft is arranged in inclined position longitudinally of the frame, and is of such length that the wheel 44 is adjacent to the seat 19. When the shaft 43 is turned by wheel 44, the drum 36 will be oscillated, and the front axle will be moving, the direction depending upon the direction of movement of shaft 43.

A brake of the expanding type is arranged in the hub of each of the wheels 5, and each bracket is operated by the following mechanism:—An arm 45 extends upwardly from each of the brake devices of each wheel, and a link or rod 46 connects the upper end of each arm to the lower end of a cross arm 47, on the adjacent end of a shaft 47$^a$ journaled on the frame. A link or rod 48 connects the upper end of one of the arms 47 to the lower end of a lever 49, pivoted at 50, intermediate its ends on the frame adjacent to the seat. The lever 40 is provided with a latch mechanism 51 for engaging a toothed quadrant 52 on the frame to hold the bar in adjusted position. A motor 53, an explosive engine in the present instance, is supported on the front end of the frame beneath the hood, and the shaft 54 of the engine is provided with a loose bevel gear wheel 55, at its rear end. The wheel 55 meshes with a bevel gear wheel 56 on the shaft 13 before mentioned, and the said wheel 55 may be connected to the engine shaft by means of a clutch 57. The clutch is operated by means of a lever 58, pivoted at 59 intermediate its ends to the rear end of a bracket 61 which extends rearwardly from the frame. The lever is connected at its upper end to the clutch by a link or rod 60, and the lower end is in position for engagement by the foot of the operator.

The cultivating mechanism is connected to and supported by a bracket comprising an arch body 61, and alined lateral lugs 62. Arms 63 are rigidly connected at their rear ends to the sides of the body, and the front ends of the arms are pivoted to the sides of the frame, at the rear of the motor, as shown at 64. A rod 65 is connected at its lower end to each arm, near the bracket, and the upper end of each rod is slidable through an opening in the lower end of a lever 66, pivoted at 67 to the frame, and having latch mechanism 68, coöperating with a toothed quadrant 69 on the frame to hold the lever in adjusted position. A spring 70 encircles each rod between the arm and the lever, and a nut 71 engages the rod above the lever.

By means of the levers 66, the bracket may be raised and lowered, and the connection between the levers and the bracket is yielding, so that the bracket may yield upwardly to avoid injury to the cultivating mechanism. The controlling mechanism for the motor is controlled by a lever 72, pivoted to the frame at 73, and having latch mechanism 74, coöperating with a toothed quadrant 75, to hold the lever in adjusted position. A link 76 connects the lever to the motor controlling mechanism. The link 76 and the lever 72 control the transmission 77, to connect the motor with the wheels at different speeds. A bracket 61—62 is for the attachment of cultivating mechanism, and the said bracket is so arranged that any set of plows or cultivating devices from an old cultivator may be attached to the bracket. It will be noted that staples 78 are connected with the bracket at the rear thereof, for assisting in supporting the cultivating mechanism. Such mechanism has not been shown since it is of ordinary form and different devices may be used with the bracket. The brakes of the rear wheels are operated in unison, by means of the lever 49.

We claim:—

A motor vehicle for farm work, comprising a body for supporting the motor, front and rear axles below the body, wheels journaled on the axles, each of the said axles having an arch intermediate its ends extending upwardly to approximately the tops of the wheels to permit the wheels to move astride a row of growing plants without interference from the vehicle, a fifth wheel in connection with the arch of the front axle, springs between the fifth wheel and the body, the arch of the rear axle being connected with the body, a seat in rear of the rear axle and above the arch, and controlling mechanism for the motor arranged adjacent to the seat, said body having means for engagement by cultivating implements adjacent to the rear axle.

EDDIE L. FOLSE.
STANISLAUS E. ROBICHAUX.

Witnesses:
RICHARD S. GENDIOZ,
FRANKLIN P. GENDIOZ.